July 11, 1950 E. C. GUEDON 2,514,949

PHONOGRAPH SPINDLE

Filed Feb. 20, 1946 2 Sheets-Sheet 1

INVENTOR.
Emile C. Guedon.
BY Harry Langsam
ATTORNEY.

PHONOGRAPH SPINDLE

Filed Feb. 20, 1946 2 Sheets-Sheet 2

INVENTOR.
Emile C. Guedon
BY
Harry Langsam
ATTORNEY.

UNITED STATES PATENT OFFICE 2,514,949

PHONOGRAPH SPINDLE

Emile C. Guedon, Audubon, N. J.

Application February 20, 1946, Serial No. 648,978

8 Claims. (Cl. 274—10)

This invention relates to automatic phonographs of the drop type, and it has particular relation to an improved turntable spindle for that form of automatic phonographs of the type specified in which the records are supported above the turntable at their centers by a shoulder or support on the spindle and at their edges by a supporting device located at one side of the turntable.

Phonographs of the type indicated employ a spindle which is provided above the record supporting shoulder with a record detaining member. This member cooperates with all but the lowermost record of a stack of records supported on the shoulder to restrain lateral movement thereof as the lowermost record is moved laterally for discharge thereof from the shoulder. To permit such lateral movement of the lowermost record, the restraining member is in each case spaced above the cooperating shoulder a distance somewhat greater than the thickness of conventional disc records. For a great many years, such records, as supplied to the market, have had a thickness in the neighborhood of about 0.090 inch. In recent years, a new form of disc record has appeared which is much thinner than the aforementioned records and which has a thickness of only about 0.045 inch to about 0.055 inch. Now, these new records cannot be used satisfactorily on drop type automatic phonographs having spindles of the type heretofore known because, in practically all cases, the spacing between the record supporting shoulders and the record detaining members thereof exceeds the combined thickness of two such thin records. Hence, when a stack of the new, thin records is loaded in a phonograph of the type indicated above and the phonograph is set in operation, the two bottom records of the stack will be discharged at a time during each cycle instead of only one.

It is the principal object of my present invention to provide an improved spindle for phonographs of the type specified above which will be entirely free from the previously mentioned objection.

More specifically stated, it is an object of my present invention to provide an improved turntable spindle for drop type automatic phonographs which will readily accommodate records of different thicknesses and which will function to permit discharge of only one record at a time regardless of its thickness.

Another object of my present invention is to provide an improved turntable spindle for phonographs of the type set forth above which can be adjusted very easily to suit the thickness of either the old conventional disc records, or the new, thin disc records.

Another object of my present invention is to provide an improved turntable spindle as previously set forth which is suitable for use in and can be applied readily to existing drop type automatic phonographs whereby such phonographs can easily be made suitable for the new, thin records as well as for the old, thicker records.

Still other objects of my present invention are to provide an improved turntable spindle as described above which is very simple in construction, to provide a spindle which is extremely efficient in use and is, in fact, practically fool-proof, to provide a spindle as aforesaid which can be manufactured easily and economically in large quantities, and to provide a spindle which is very inexpensive in cost.

The foregoing and other objects and advantages of my invention, which will become apparent as the description proceeds, I accomplish by making the record supporting shoulder or other similar member and the record stack detaining member adjustable relative to each other axially along the spindle. By this expedient, the spacing between the supporting member and the detaining member can be varied at will to suit the requirements of records of any desired thickness. While either one or both of the supporting member and the detaining member may be adjustably arranged on the body of the spindle, I preferably arrange the detaining member to have a relatively fixed record stack detaining position and adjustably mount the supporting member on the spindle body for adjustment relative to the detaining member. A suitable latch or other holding means cooperates with the adjustable record supporting member to hold it in the desired position of adjustment.

It will be understood that my present invention is capable of receiving a variety of expressions. For purposes of illustration, I have shown two embodiments thereof in the accompanying drawings in which the same reference characters designate corresponding parts, and in which—

Figures 1, 2, 3, 4:
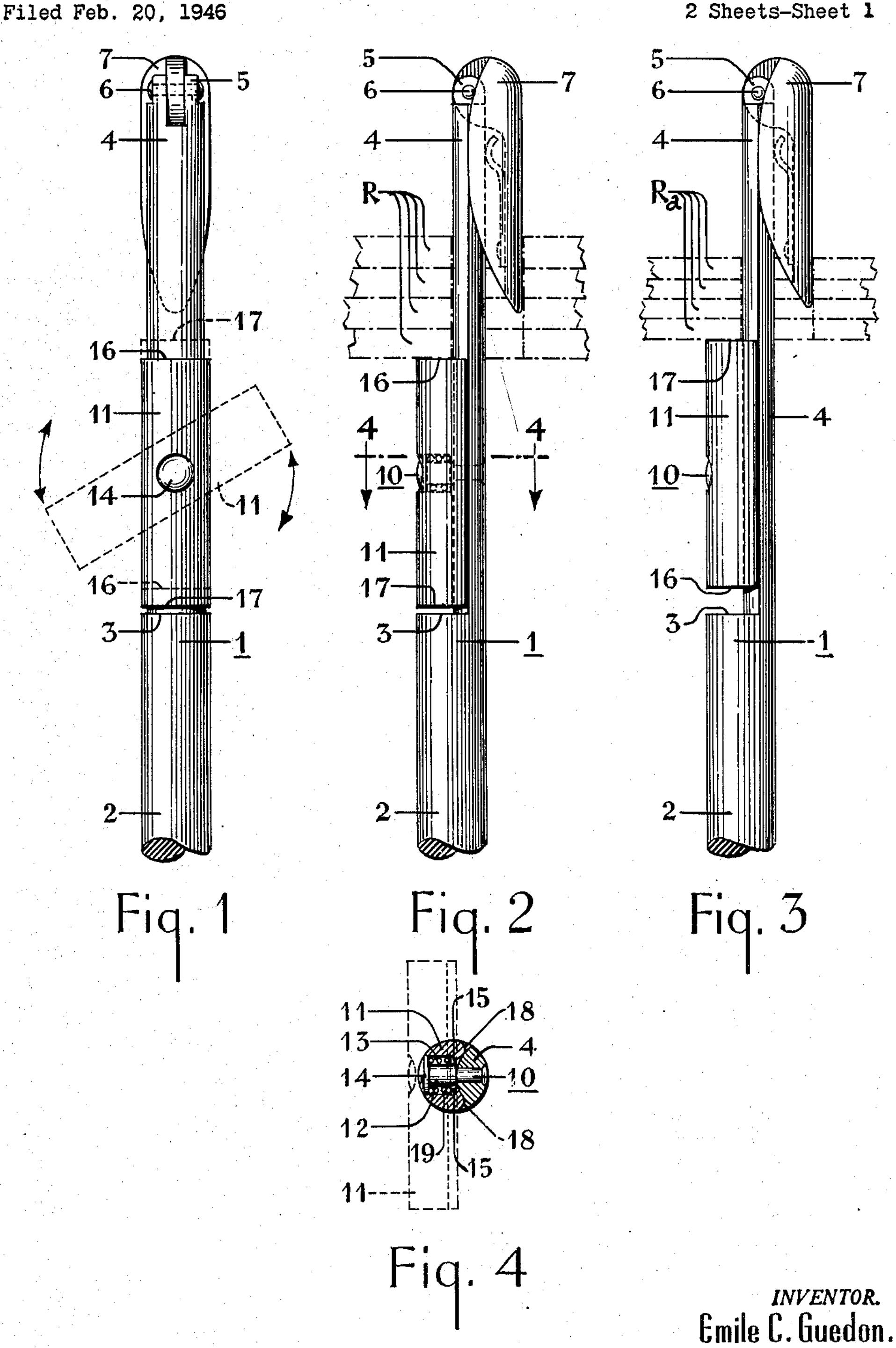
Fig. 1 is a front elevation of one form of spindle according to my present invention, the adjustable record supporting member being shown in several positions by means of the dotted lines.
Fig. 2 is a side elevation thereof with the record supporting member set to render the spindle suitable for relatively thick records.
Fig. 3 is a view similar to Fig. 2 but showing the record supporting member set to render the spindle suitable for relatively thin records.
Fig. 4 is a sectional view taken on the line 4—4 of Fig. 2, the record supporting member being shown in dotted lines in the position which it occupies when rotated 90° from the position thereof shown in Fig. 2.
Figure 5:
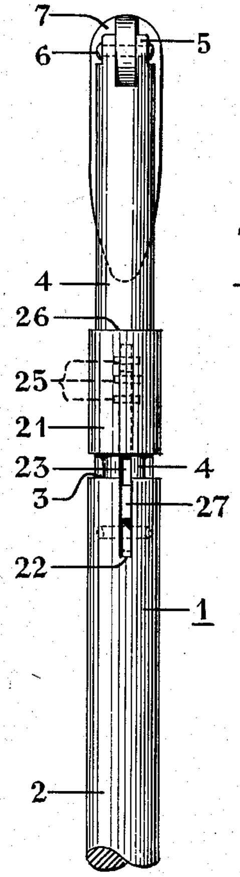
Figure 6:
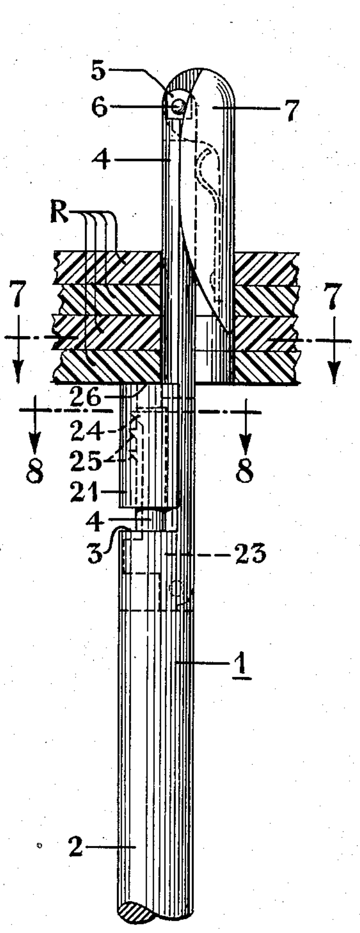
Figure 9:
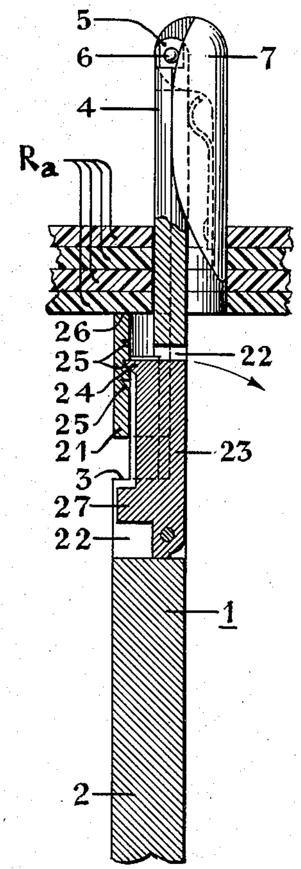
Figure 7:
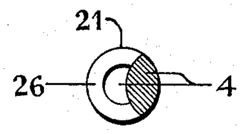
Figure 8:
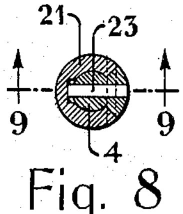

Figs. 5, 6 and 9 are views similar, respectively, to Figs. 1, 2 and 3, with Fig. 9 showing the spindle partly in longitudinal section along the line 9—9 of Fig. 8, and Figs. 7 and 8 are sectional views taken, respectively, on the lines 7—7 and 8—8 of Fig. 6.

Referring in greater detail to the drawings, there is shown, in Figs. 1 to 4, a spindle body 1 having a lower part 2 which can be non-rotatably arranged in concentric relation to a turntable (not shown) in known manner and which is formed with a shoulder 3 above which the body 1 has an upper part 4 of reduced cross section in prolongation or continuation of the lower part 2. The upper spindle part 4 is preferably located at one side of the axis of the lower spindle part 2, and is formed at its upper extremity with a yoke 5. Pivotally mounted in the yoke 5 on a pin 6 which extends in a direction at a right angle to the spindle axis is a record detaining member or detent 7 which can be swung on its pivot pin 6 so as to occupy either a raised position concentric with the lower spindle part 2, in which case it extends away from the shoulder 3, or a position eccentric to the lower spindle part 2 (as shown in Figs. 2 and 3), in which case it extends downwardly along one side of the upper spindle part 4 toward the spindle shoulder 3. In the latter case, the detent 7 cooperates with the upper spindle part 4 to maintain the records R of a stack of superposed records eccentric to the lower spindle part 2. The construction thus far described forms part of the subject matter of my copending application, Serial Number 637,663, filed on December 28, 1945, and is there more fully set forth and claimed.

Pivotally mounted on the upper spindle part 4 between the shoulder 3 and the lower end of the detent 7 (as viewed in Figs. 1-3) by means of a stud 10 is a record stack supporting member 11. The member 11 and the detent 7 are disposed on diametrically opposite sides of the axis of the spindle. The stud 10, which is disposed at right angles to both the spindle axis and the pin 6, has an enlarged portion 12 which is received in a still larger bore 13 formed in the record supporting member 11 and terminates in a head 14. The bore 13 is provided with an annular shoulder 15. A compression coil spring 19 around the stud portion 12 within the bore 13 and between the stud head 14 and the shoulder 15 constantly urges the record supporting member 11 against the upper spindle part 4. The side or face of the member 11 next adjacent to the upper spindle part 4 is formed transversely on the same curvature as the latter so that, when the supporting member 11 is in the positions shown in Figs. 2 and 3, it is held snugly against the upper spindle part 4 by the spring 19. In these positions, the combined transverse dimension or diameter of the support 11 and the upper spindle part 4 is equal to that of the lower spindle part 2, and the supporting member 11 is then in substantial prolongation or continuation of the lower spindle part 2 above the shoulder 3.

The stud 10 passes through the supporting member 11 in closer proximity to one end 16 thereof than to the other end 17 thereof. Thus, when the supporting member 11 is in the position of Fig. 2, its end 16 is then in proximity to the lower end of the detent member 7 and the spacing between these proximate ends axially along the spindle is of the order of the thickness of relatively thick records R. On the other hand, when the supporting member is rotated 180° in either direction on its stud 10 (as shown by the appended arrows in Fig. 1), its end 17 is brought into proximate relation with the lower end of the detent member 7. Since the end 17 is at a greater distance from the stud 10 than is the end 16, it will be apparent that the axial spacing between the end 17 and the lower end of the detent member 7 is now less and of the order of the thickness of relatively thin records $R_a$. To prevent binding of the supporting member 11 against the upper spindle part 4 with which it mates when in either of its two above described positions and to facilitate rotating it, its longitudinal edges 18 may be suitably curved circumferentially, as shown in Fig. 4.

When a stack of relatively thick records R is to be played, the supporting member 11 is set as shown in Fig. 2 with its end 16 uppermost. The records are then threaded on the spindle and the lowermost one rests on the end 16 which constitutes a supporting shoulder therefor. The detent member 7 which, in its relatively fixed record restraining position as shown in Figs. 1-3, is on the diametrically opposite side of the upper spindle part 4 from the supporting member 11 now extends down through the center holes of all the records R except the lowermost one. Thus, the latter record is free to be moved laterally to the left (as illustrated) by any suitable and well known mechanism at one side of the turntable to effect discharge thereof while the detent member 7 restrains lateral movement of the other records of the stack. This action takes place for each successive lowermost record, in turn. Now, when thin records $R_a$ are to be played, it is merely necessary to rotate the member 11 180° to bring its end 17 uppermost. The end 17 then serves as a support for the records, and the detent 7 again extends down through the center holes of all the records of the stack except the lowermost one. Hence, the spindle is equally suitable for thin records and for thick records.

In some cases, it may be desirable to make provision for records of more than two different thicknesses, and for such cases, the form of my invention shown in Figs. 5-9 may be found suitable. Here, instead of the rotatable record supporting member 11, there is provided a slidable record supporting member 21 on the upper spindle part 4 for cooperation with the detent member 7. The spindle 1 is formed with a slot 22 in which is pivotally mounted a latch member 23 having a latching toe 24 which cooperates with a plurality of V-notches 25 formed in the supporting member 21. The member 21 may be slid up or down axially along the spindle part 4 to vary the distance between its upper record supporting end 26 and the lower end of the detent member 7, thereby to accommodate records of different diameters. Once the support 21 is in a selected position, the latching toe 24 is brought into engagement with the aligned notch 25 to releasably latch the member 21 in place. If desired, a suitable spring may be provided to constantly urge the latch 23 into latching position. However, the latch may be manipulated manually and it will be held in proper latching position, once its toe 24 engages a notch 25, by the weight of the records supported on the member 21. To facilitate releasing the latch 23 from the member 21, it may be provided with an extension 27 which can be engaged by a finger nail or by a suitable tool to push the latch away from the member 21.

From the foregoing description, it will be apparent to those skilled in the art that I have provided an improved phonograph turntable spindle which can be incorporated into existing phonographs to render them suitable for operation with the new, relatively thin, as well as the old, relatively thick records. Many forms of my present invention other than those described above are, of course, possible. For example, the record stack supporting members 11 and 21 may be adjustably mounted on the lower spindle part 2 instead of on the upper part 4. Also, if found desirable, the detent member 7 may be made adjustable lengthwise of the spindle. It will also be evident that my improved spindle may be used effectively in many phonographs employing a horizontally disposed spindle with the records arranged thereon in vertical planes so that one of the end records of the stack will be in engagement with the member 11, the member 21 or some other corresponding member. Hence, I desire that my invention shall not be limited except to the extent made necessary by the prior art and by the spirit of the appended claims.

I claim as my invention:

1. A phonograph turntable spindle comprising a body portion, means on said body portion against which one end record of a stack of records may engage, and means spaced laterally and axially from said first named means for restraining lateral movement of all said records but said end record while permitting lateral movement of said end record for removal from engagement with said first named means, said first named means being adjustably mounted on said body portion for movement thereon to one or another of two positions in one of which the proximate ends of said first named means and said restraining means are closer together axially along said spindle than in the other of said positions whereby the axial spacing between said two means may be varied to accommodate records of different thicknesses.

2. A phonograph turntable spindle for phonographs of the type in which a stack of superposed records is supported centrally and in which successive lowermost records of the stack are moved laterally to free them for dropping toward said turntable, said spindle comprising a body portion, means on said body portion on which the lowermost record of the stack may rest for supporting said stack, and means having a relatively fixed restraining position on said body portion displaced laterally from said supporting means for restraining all but the successive lowermost records of the stack against lateral movement, said restraining means being also spaced from said supporting means axially along said spindle a distance sufficient to permit lateral movement of each lowermost record, in turn, while the records thereabove are restrained, and said supporting means being adjustably carried on said body portion for movement to one or another of two positions for varying the axial distance between proximate ends of said supporting means and said restraining means for accommodation of records of different thicknesses.

3. A phonograph turntable spindle for phonographs of the type in which a stack of superposed records is supported centrally and in which successive lowermost records of the stack are moved laterally to free them for dropping toward the turntable, said spindle comprising a body portion, means on said body portion on which the lowermost record of the stack may rest for supporting said stack, and means comprising a member having a relatively fixed restraining position on said body portion displaced laterally from said supporting means for restraining all but the successive lowermost records of the stack against lateral movement, said restraining means being also spaced from said supporting means axially along said spindle a distance sufficient to permit lateral movement of each lowermost record, in turn, while the records thereabove are restrained, and said supporting means comprises a member rotatably mounted on said body portion below said restraining means on an axis which is normal to the axis of said spindle and which passes through said member in closer relation to one end thereof than to the other end thereof whereby, when said rotatable member is disposed on said body portion in a first position with its said one end in proximate relation to the adjacent end of said restraining means said proximate ends are spaced from each other axially along said spindle a first distance which is of the order of the thickness of records of one thickness, and when said rotatable member is rotated 180° to a second position to bring its other end into proximate relation to said adjacent end of said restraining means the then proximate ends of said member and said restraining means are spaced from each other axially along said spindle a different distance from each other which is of the order of the thickness of records of a different thickness.

4. The invention of claim 3 including means for releasably holding said rotatable member in either one of said two positions.

5. A phonograph turntable spindle for phonographs of the type in which a stack of superposed records is supported centrally and in which successive lowermost records of the stack are moved laterally to free them for dropping toward said turntable, said spindle comprising a body portion, means on said body portion on which the lowermost record of the stack may rest for supporting said stack, and means having a relatively fixed restraining position on said body portion displaced laterally from said supporting means for restraining all but the successive lowermost record of the stack against lateral movement, said restraining means being also spaced from said supporting means axially along said spindle a distance sufficient to permit lateral movement of each lowermost record, in turn, while the records thereabove are restrained, and said supporting means is movably carried by said body portion for axial adjustment thereon relative to said restraining means to thereby vary the axial spacing between said supporting means and said restraining means for accommodation of records of different thicknesses.

6. The invention of claim 5 including means on said body portion for releasably latching said supporting means in any preselected one of a plurality of positions.

7. A phonograph turntable spindle for phonographs of the type in which a stack of superposed records is supported centrally and in which successive lowermost records of the stack are moved laterally to free them for dropping toward said turntable, said spindle comprising a body portion having a lower part adapted to be non-rotatably arranged in concentric relation to the turntable and having a shoulder, and an upper part extending upwardly from said shoulder in prolongation of said lower part, means on said body portion on which the lowermost record of the stack may rest for supporting said stack, and means having a relatively fixed restraining position on said body portion displaced laterally from said supporting means for restraining all but the successive lowermost record of the stack against lateral movement, said restraining means being also spaced from said supporting means axially along said spindle a distance sufficient to permit lateral movement of each lowermost record, in turn, while the records thereabove are restrained, said supporting means and said restraining means being both carried by said upper part, and said supporting means being adjustably carried on said upper part for movement to one or another of two positions for varying the axial distance between proximate ends of said supporting means and said restraining means for accommodation of records of different thicknesses.

8. The invention of claim 7 wherein said restraining means is carried on the opposite side of said upper part from said supporting means and above said supporting means.

EMILE C. GUEDON.

REFERENCES CITED

The following references are of record in the file of this patent:

UNITED STATES PATENTS

| Number | Name | Date |
|---|---|---|
| 2,235,693 | Wells | Mar. 18, 1941 |

FOREIGN PATENTS

| Number | Country | Date |
|---|---|---|
| 520,941 | Great Britain | May 8, 1940 |
| 552,546 | Great Britain | Apr. 13, 1943 |